(12) United States Patent
Wissing

(10) Patent No.: US 9,381,678 B2
(45) Date of Patent: Jul. 5, 2016

(54) METHOD AND ARRANGEMENT FOR RECYCLING ADHESIVE-CONTAINING FILM WASTE

(71) Applicant: Wolfgang Leitz, Welzheim (DE)

(72) Inventor: Johannes Wissing, Stadtlohn (DE)

(73) Assignee: Wolfgang Leitz (DE)

( * ) Notice: Subject to any disclaimer, the term of this patent is extended or adjusted under 35 U.S.C. 154(b) by 133 days.

(21) Appl. No.: 14/466,430

(22) Filed: Aug. 22, 2014

(65) Prior Publication Data

US 2015/0041573 A1  Feb. 12, 2015

Related U.S. Application Data

(63) Continuation of application No. PCT/EP2013/051115, filed on Jan. 22, 2013.

(30) Foreign Application Priority Data

Feb. 24, 2012 (DE) .................. 10 2012 101 481

(51) Int. Cl.

| | |
|---|---|
| *B02C 23/00* | (2006.01) |
| *B29B 17/00* | (2006.01) |
| *B02C 23/18* | (2006.01) |
| *B02C 23/20* | (2006.01) |
| *B29B 17/04* | (2006.01) |
| *B29K 105/00* | (2006.01) |
| *B29L 7/00* | (2006.01) |
| *B29L 9/00* | (2006.01) |
| *B29K 105/26* | (2006.01) |

(52) U.S. Cl.
CPC ............. *B29B 17/0036* (2013.01); *B02C 23/18* (2013.01); *B02C 23/20* (2013.01); *B29B 17/0026* (2013.01); *B29B 17/0412* (2013.01); *B02C 23/00* (2013.01); *B29K 2105/0097* (2013.01); *B29K 2105/25* (2013.01); *B29K 2105/26* (2013.01); *B29L 2007/007* (2013.01); *B29L 2007/008* (2013.01); *B29L 2009/00* (2013.01); *Y02W 30/62* (2015.05)

(58) Field of Classification Search
CPC ........ B02C 23/00; B02C 23/18; B02C 23/20; B29B 17/0036; B29B 17/0412; B29B 17/0026
USPC .................. 241/24.18, 24.28, 101.2
See application file for complete search history.

(56) References Cited

U.S. PATENT DOCUMENTS

| | | | | |
|---|---|---|---|---|
| 5,323,971 A | * | 6/1994 | Nishibori ................ | B02C 2/042 241/152.2 |
| 7,757,974 B2 | * | 7/2010 | Hofmann ................ | B29B 17/02 241/20 |

(Continued)

FOREIGN PATENT DOCUMENTS

| | | |
|---|---|---|
| DE | 2114304 | 10/1972 |
| DE | 19531886 | 3/1997 |

*Primary Examiner* — Faye Francis
(74) *Attorney, Agent, or Firm* — Bohan Mathers, LLC; Patricia Mathers; Jeffrey Joyce

(57) ABSTRACT

A method for recycling adhesive-containing film waste. The film waste is initially coarsely chopped in a chopping device. A liquid or powdered additive that reduces the strength of the adhesive on the film waste is added to material in the chopping device or sprayed on components of the chopping device. The waste material exits the chopping device through a perforated sheet as clumps of material, which are then fed into an agglomerator, where they are agglomerated or compacted into strands of material. The temperature in the agglomerator is between 100 and 200 degrees C., i.e., below the melting point of the material of the film. The strands exiting the agglomerator are then cut to granule size.

15 Claims, 1 Drawing Sheet

(56) References Cited

U.S. PATENT DOCUMENTS 8,690,090 B2 * 4/2014 Kulesa ................ B29B 17/0026
241/101.2

2008/0191069 A1 * 8/2008 Hofmann ................ B29B 17/02
241/15

* cited by examiner

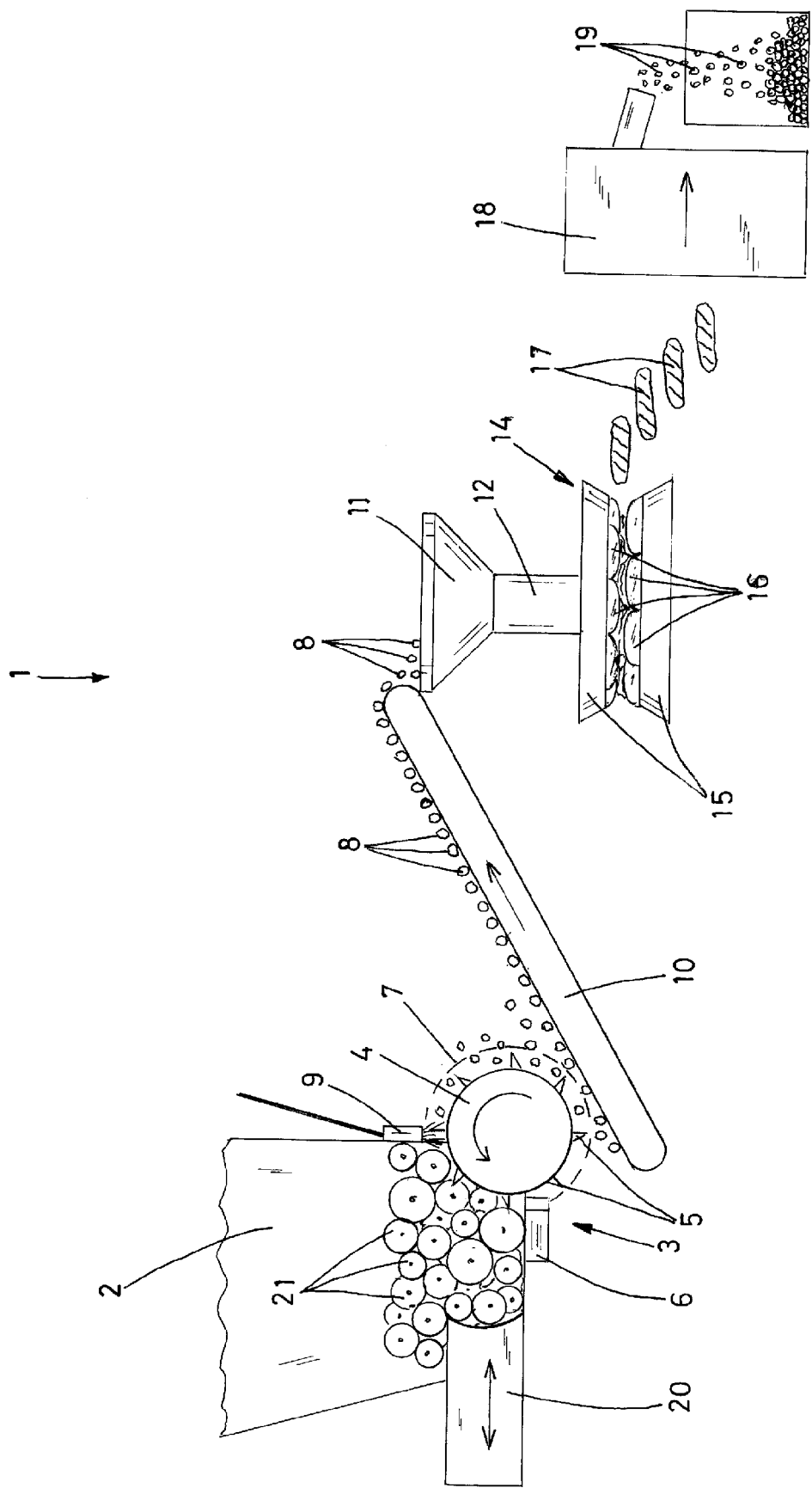

METHOD AND ARRANGEMENT FOR RECYCLING ADHESIVE-CONTAINING FILM WASTE

BACKGROUND INFORMATION

1. Field of the Invention

The invention relates to the field of recycling film waste that contains an adhesive.

2. Discussion of the Prior Art

German Patent Application DE 195 31 886 A1 teaches a continuous process for reclaiming raw materials from coated films. In this process, the coatings are removed from magnetic tapes or also photographic films, so that the materials in the tapes or films can be reclaimed and also, so that the carrier material that is now free of the coating can be processed. This prior art reference does not address the problems that exist in dealing with film waste that is coated with an adhesive.

German Patent DE 21 14 304 B2 discloses a process for reclaiming polymers from waste products, whereby the waste products are continuously reduced in size and rendered to a fleece, which is then chopped or beaten into small packets of fiber. A disc compactor may be used for subsequently compacting the fiber packets. The waste products occur in the manufacture of synthetic fibers. This patent also does not discuss treating film waste that is coated with adhesive.

The closest prior art for dealing with adhesive-coated film waste is German Patent DE 42 21 681 C2, which describes a method of treating, for example, plastic waste from a stamping process, the waste frequently designated as "stamp skeletons." The process may also be used to treat waste that includes adhesive tapes, large-area adhesive films, etc.

The stickiness or adhesive strength of the adhesive is a problem, because the adhesive sticks to the equipment that is used for reducing the size of the material and gums it up. Also, higher maintenance may be required to keep the equipment in operating condition.

The prior art teaches adding adhesive-free material to the adhesive-coated material, i.e., the film waste, in order to reduce the adhesive strength of the total volume of the waste to be processed. This requires a comparatively complex logistic, because the non-adhesive containing material that is to be added to the adhesive-coated film waste should preferably be from the same group of material as that of the film waste. For example, when processing adhesive-coated polyethylene (PE) film, additives of non-adhesive PE material are preferably used. This ensures that the material that is reclaimed is as pure as possible. This is important, because, otherwise, the properties of products made from the reclaimed material would suffer significant deterioration.

Aside from the complication of managing the process or preparing for implementing the process, is the disadvantage that the adhesive strength of the adhesive-coated film waste remains unchanged. Adding non-adhesive waste only increases the likelihood that the sticky surfaces of the adhesive-coated film waste, as long as they haven't clumped together, will be covered by the non-adhesive waste, thereby reducing the total surface area of sticky material. The problem is that the adhesive strength of the sticky surfaces remains undiminished and when the sticky surfaces of this mixed waste come into contact with the processing equipment, the danger of gumming up the processing equipment remains unchanged, albeit in a reduced frequency.

Despite these limitations, processing adhesive-coated film waste is fundamentally desirable, because the only alternative now is a thermal treatment of film waste in order to remove it from the stream of waste material. It is desirable for ecological reasons to recycle film material that is made from petroleum products, i.e., not from renewable resources, and to feed the recycled material back into the stream of usable material. It is also important that the process of reclaiming material be cost-effective, so that the re-use of the film waste is encouraged out of economic considerations.

BRIEF SUMMARY OF THE INVENTION

The object of the invention is to improve a conventional method of reclaiming film waste such, that the method is economical to implement and also enables an interruption-free operation of the equipment used to reclaim the material. Furthermore, it is an object of the invention to describe equipment that is suitable to implement the method according to the invention.

The invention suggests initially reducing the size of the film waste to a coarse size in a crushing or chopping device. The fact that the film waste is coarsely chopped is essential, because, at this stage, the film waste still has an adhesive strength that is enough to quickly gum up or jam the very fine tooling or openings that are typical for fine crushing or chopping equipment. The chopping equipment usually has a strainer, a sieve, a perforated sheet or something similar, the perforations or holes of which have a particular size. This type of equipment is referred to hereinafter as a sieve. Material that is too coarse to pass through the holes is subjected to continued cutting or chopping, until the material is small enough to pass through the sieve holes. The finer the sieve, the longer the material is held in the sieve.

The coarse chopping and the correspondingly large size of the sieve according to the invention has several advantages:

First, larger holes don't get blocked as quickly as smaller holes.

Second, the material passes through the chopping equipment more quickly.

Third, the larger sieve holes provide the advantage that the nozzle or funnel effect that is created by the edge encircling the hole and that extends to the middle of the hole is reduced with larger holes, compared to smaller holes, which means that material that might possibly block a hole is easier to push through the larger hole than than through a smaller one. The larger size sieve according to the invention therefore has good self-cleaning characteristics.

Fourth, depending on the ratio between the surface and the volume of a clump of material, the ratio of the possibly sticky outer surface of the clump decreases as the diameter of the clump increases. In other words, the adhesive strength of the clump of material decreases as the size of the clump increases.

Fifth, the energy required to carry out the chopping or cutting operation is less in a coarse chopping machine than in a chopper that makes finer cuts.

The cutting mills or similar chopping machines that are used in the industry are typically used with sieve inserts having a hole size of 8 to 16 mm in diameter. The coarse chopping device according to the invention, on the other hand, works with a hole size of 50 to 150 mm in diameter. Practical tests show that a hole size of 80 to 120 mm diameter is advantageous. The clumps of material coming through the holes have a diameter of 10 to 120 mm, that is, they are smaller than the size of the hole, particularly then, when they are not pressed through the sieve at an orientation directly perpendicular to the holes, but are pushed at an angle through the sieve. The stickiness of these larger clumps does not plug up or gum up the downstream processing equipment, nor result in a build-up of material in the equipment.

The pressure from the material being fed into the chopper results in an automatic self-cleaning of the equipment, which ensures interruption-free operation of the chopping equipment. The adhesive-coated surface portions of the film waste ensure that the waste clumps together. The clumps are relatively porous, because of the relatively coarse structure of the film waste. The formation of clumps significantly reduces the stickiness of the surface of the film material, compared to the total volume of material contained in the clump, much more so than if the film waste were to be processed as flat pieces.

The second step in the method according to the invention is to treat the waste material to reduce the adhesive strength, to increase the ability to transport the clumps of material easily. To this end, a liquid or powder additive is added to the waste material, whereby this additive reduces the adhesive strength of the adhesive portion. This can be done in various ways: For example, a powder, such as chalk, talcum, or a finely ground synthetic powder, may be strewn or sprinkled over the porous material and/or the chopping equipment, so that the sticky surface of the film waste is covered with the powder. Thus, even though the properties of the adhesive have not changed, covering the adhesive portions of the film waste reduces their adhesive strength, because the powder-coated material won't stick to the surfaces of the processing equipment or, if it does stick, then only to a very significantly lesser degree.

This second method step may follow the first step, i.e., the coarse chopping step, or both steps may be done simultaneously. It is advantageous to treat not only the clumps of material that are formed in the chopping device, but the chopping device itself, thereby reducing the risk that the film waste will adhere to the chopping device. This second method step may also be implemented before the so-called first method step, by applying the liquid or powder additive to the chopping tools before they come into contact with the adhesive-containing waste material.

As an alternative to using the powder additive mentioned above, a liquid additive may be used to reduce the strength of the adhesive portion of the waste. This additive may be an oil. Synthetics are manufactured from a mineral oil basis, so the oil is preferably an additive that is materially related to the film waste. The previously mentioned powder additive is preferably also made of the same synthetic material as that of the film waste or of the conventional additives that are added to the synthetic material when the granulate used for forming the product is produced.

The adhesive properties may also be changed, as an alternative to using the mentioned powder or a comparable lubricant to reduce the strength of the adhesive on the surface of the processing equipment. For example, a detergent in water may be applied to the clumps of material and/or the chopping equipment.

The additive used to reduce the strength of the adhesive portion, whether liquid or powder, may be applied to the clumps of material and/or the chopping tool(s) by means of unpressurized or pressurized sprayer equipment that sprays the additive in a fine distribution over the clumps of material and/or the chopping tools. The additive may be sprinkled, trickled, or sprayed onto the clump, in a manner that keeps the amount of additive used to a minimum, in order to reduce the effect the additive has on the properties of the reclaimed material as much as possible, and, of course, to also provide the most cost-effective method of processing the material.

The clumps of material are porous, just as they were before, but are now less sticky than before. These clumps of material are then transported in a third method step according to the invention from the chopping equipment, or from a sprayer or wetting station that is integrated into or placed subsequent to the chopping equipment, to an agglomerator, such as, for example, a plate compactor. German Industrial Design DE 298 14 921 U1, for example, discloses the basic construction a plate compactor.

In contrast to other agglomerators, the place compactor has an open edge around its periphery, which is an advantage, because it allows outgassing of the material that is being worked in the plate compactor. The present invention proposes that the material in the agglomerator be heated to a temperature of greater than 100 degrees C., preferably to a temperature between 100 and 200 degrees C. The temperature may be influenced by the volume of the material fed into it and by the motion in the agglomerator, for example, by the rotational speed of the stirring and cutting tools. In the case of a plate compactor, the temperature may be influenced by the relative speed between the plates of plate compactor and by the surface structure of both plates. The temperature is adjusted accordingly to be lower than the melting point of the film material that is being processed. A synthetic powder additive of the same type of material as that of the film waste may be added, to reduce the adhesive strength of the film waste. The temperature and the mechanical processing of the synthetic additive, which causes tumbling and rubbing motions, results in a thorough contact of the powder additive and the film waste, so that the material exiting from the agglomerator is almost homogeneous. The material may be granular in form but, coming from a plate compactor, is typically in the form of small sausage-like strands of material.

If a liquid, such as, for example, a detergent in a watery solution, is used as an additive to reduce the adhesive strength of the clumps of materials, then the temperature in the agglomerator effectively outgasses a substantial portion of this liquid. The gas can quite easily exit a plate compactor, because of its construction, and can be suctioned off or filtered out.

A fourth, final method step according to the invention is to cut the strand of material coming out of the agglomerator to small grain-like bodies. A rotating knife may be used to do this. This cutting operation may be done directly in the agglomerator. Should, however, the agglomerated material exit the agglomerator with an undesirable grain size, then a separate method step may be implemented to re-size the agglomerated material. Typically, the agglomerated material exits the plate compactor in the form on long material strands, that are then cut to size. These grain-like bodies, which are also referred to as granules, are also referred to as agglomerate, as a way of distinguishing them from the so-called granulate that is commonly used in the plastics industry. Granulate normally has a smooth surface, whereas the agglomerate formed according to the invention may be decidedly irregular in form, for example, a strand of material previously formed in the plate compactor typically has an irregular surface. The action of the plate compactor creates strands of material that frequently have diagonal or spiral grooves along its surface and these grooves are then, of course, found again in the surface of the agglomerate.

The equipment that is used, namely, just a coarse chopper and the agglomerator, is very robust equipment and, therefore, may be operated in a very economical manner, free of interruptions and requiring little maintenance. The processing method according to the invention is very cost-effective, because the strength of the adhesive on the film waste is not reduced by bathing the waste material in solvents, such as alcohol or similar additives. Those methods require significant use of expensive materials and additives. Instead, the method according to the invention teaches spraying initially formed clumps of material with a relatively small amount of a liquid or powder additive, and this provides a method that is also very cost-effective.

Basically any chopping machine with large-size holes may be used. Practical experiments have shown that the use of a chopping machine in the form of a shaft chopper, for example, a multi-shaft chopper, or, what is particularly cost-effective, a so-called single-shaft chopper, is effective. This type of chopping machine has a rotatable shaft, with knives, referred to as "first knives", arranged on the shaft. This chopping machine then also has second knives that are stationary, so that the waste material is chopped by an interaction of the rotating first knives and the stationary second knives. The second knives are mounted on a stationary knife block in front of the chopper shaft. A shield with perforations or through-holes in it is provided around the shaft behind the knife block. The chopped film waste is forced through these through-openings, which, because of the strength of the adhesive that still exists on the waste material, results in the formation of the previously mentioned clumps of material. The shape and the size of the clumps of material that are desired is influenced by the setup of the first and second knives, as well as by the width of the gap between these first and second knives, and also by the dimension and contour of the through-openings in the shield, which may be circular, hexagonal, etc. This arrangement allows the equipment to be adjusted, so as to achieve optimal results for the specific type of material to be processed.

The shield may be a grate, preferably, though, it is a perforated sheet, so that the shield is as stable as possible.

After the chopping step, the clumps of material, which are now already less sticky, are then preferably transported on a conveyor belt. This allows the processing equipment to be as economical as possible and also allows the material to be transported across long distances. Due to the open construction of conveyor belts, interruptions in operation due to jamming up is not to be expected. Scraping chain conveyors, screw conveyors, etc. may also be suitable. When using a plate compactor as the agglomerator, it is preferable that the compactor be placed on its side, i.e., lying down, and to feed the material into the compactor from above. It may be advantageous to use a conveyor screw to feed the waste material into the agglomerator, because this type of conveyor ensures that pressure in the plate compactor does not cause the waste material to be pressed out through the top. The screw conveyor can easily work against the prevailing pressure in the plate compactor to feed additional material into the compactor. The conveyor belt mentioned above has an advantage, in that it allows the chopping machine and the plate compactor to be set up on the same plane, for example, on the floor of the factory. The material clumps exiting the chopper have to be transported to a higher plane, namely, into the feeding opening of the mentioned screw conveyor. It may be advantageous to provide a funnel at the feed-in of the screw conveyor, so that the clumps of material falling down from the conveyor belt land in the funnel and are guided then into the screw conveyor.

BRIEF DESCRIPTION OF THE DRAWINGS

The present invention is described with reference to the accompanying drawings. In the drawings, like reference numbers indicate identical or functionally similar elements. The drawings are not drawn to scale.

FIG. 1 is a schematic illustration of the film waste recycling apparatus according to the invention.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIG. 1 is a schematic illustration of film-waste recycling equipment 1 for carrying out a method according to the invention for processing film waste 21 that contains an adhesive. The film waste 21 arrives in the form of larger, crumpled up balls or wound on schematically illustrated spools, which are made of the same or similar material to that of the film. The film waste 21 is first collected in a container or hopper 2 and guided to a chopping device 3 by means of an oscillating pusher 20. The pusher 20 has the effect of pre-compacting the film waste 21 to a block of material. The chopping device 3 is constructed as a single-shaft chopper and has a rotating shaft 4, on which first knives 5 are arranged. Stationary second knives 6 are provided on a knife block in front of and in close proximity to the chopping device 3. A gap between the block with the second knives 6 and the shaft 4 with the first knives 5 forms the input side of the chopping device 3. Together, the first knives 5 and the second knives 6 chop the film waste 21 into smaller pieces. The direction of rotation of the shaft 4 is indicated by an arrow and is rotating toward the film waste 21. A shield 7 that is constructed as a perforated sheet is provided around the shaft 4, behind the second knives 6. Film waste is reduced in size and exits the chopping device 3 through the shield 7 as porous clumps of material 8.

The sprayer station 9 is mounted above the chopping device 3 and sprays an additive that reduces the strength of the adhesive on the film waste 3 onto the shaft 4 and the knives 5. In the embodiment shown, the spraying station 9 is set up so, that it distributes the additive also onto the area adjacent the shaft 4 where the blocks of material of film waste 21 are, as well as into the gap between the blocks of material and the shaft 4, so that not only the shaft 4 and its knives 5, but also the adhesive-containing waste material that is just in front of or is already engaged in the chopping process is sprayed with the additive. As an alternative to the embodiment shown, it may be sufficient to apply the additive just to the shaft 4, so that its surface is adequately and reliably protected against the stickiness of the waste material. The additive is then transmitted onto material by the shaft 4 and the first knives 5.

The additive used to reduce the strength of the adhesive may be a synthetic powder of the same material as the synthetic material in the film waste, or it may be a lubricant, such as, for example, oil, or it may be an additive that changes the properties of the adhesive, for example, a detergent dissolved in water may be sprayed onto the surface of the material, so that the clumps of material 8 have a less sticky surface.

The clumps of material 8 that exit the chopping device 3 and that have a reduced stickiness drop onto a conveyor belt 10, which then transports the clumps 8 up to a funnel 11. Due to the reduced stickiness, the clumps of material 8 do not stick to the conveyor belt 10, but instead, drop at the end of the conveyor belt 10 into the funnel 11.

The funnel 11 serves as a feed-in funnel to a screw conveyor 12 that carries the clumps of material 8 downward and into the central area of a plate compactor 14. The plate compactor 14 is oriented on its side and has two plates 15 with a gap between the two plates. The surfaces of the two plates 15 that face each other have a profile with protrusions 16, which effectively tumble and crush the material in the compactor 14. The temperature within the plate compactor 14 is in a range from 100 to 200 degrees C., i.e., just under the melting point of the material to be processed. This temperature damages or reduces the adhesive strength of the adhesive that is on the film waste. Gases that exude from the mixture of waste material and additive in the compactor 14 are easily outgassed, due to the open structure of the compactor. As a result, some portion of the adhesive or, for example, the liquid additive that was added to reduce the strength of the adhesive, are able to escape from the mixture of waste material.

The material exiting the plate compactor 14 is in the form of strands of material 17. These strands 17 are cut in a granulating device 18 to irregularly formed granules, whereby these chopped or cut material strands 17 are designated herein as agglomerate 19, to differentiate between these and the granulate that is used in the plastics industry.

It is understood that the embodiments described herein are merely illustrative of the present invention. Variations in the construction of the film-waste recycling equipment may be contemplated by one skilled in the art without limiting the intended scope of the invention herein disclosed and as defined by the following claims.

The invention claimed is:

1. A method for recycling film waste that contains an adhesive, the method comprising the following steps:
   a) reducing the film waste in size in a chopping device, the film waste being formed in the chopping device to clumps of material, each clump having a diameter between 50 and 150 mm;
   b) adding an additive to the film waste to reduce stickiness of the film waste, the additive being non-adhesive and in liquid or in powder form;
   c) feeding the clumps of material into an agglomerator, the agglomerate having a processing temperature that is lower than the melting point of the film waste to be processed; and
   d) agglomerating the material to a granular form.

2. The method of claim 1, wherein the additive is sprayed onto the clumps of material.

3. The method of claim 1, wherein the additive is a detergent that dissolves the adhesive.

4. The method of claim 1, wherein the additive is a powder that binds the adhesive.

5. The method of claim 1, wherein the additive is an oily lubricant.

6. The method of claim 1, wherein the agglomerator is a plate compactor, wherein the material fed into the plate compactor is compacted to strands of agglomerated material; and wherein these strands of agglomerated material are subsequently reduced in size to granule-size agglomerate.

7. Apparatus for reclaiming material from film waste that contains an adhesive, the apparatus comprising:
   a chopping device that has through-holes ranging from 50 to 150 mm in size to coarsely chop the film waste and form the film waste into clumps of material;
   a spraying station for applying an additive that is a stickiness-reducing substance to the clumps of material; and
   an agglomerator for compacting the clumps of material into strands of agglomerated material;
   a conveyor for transporting the clumps of material from the chopping device to the agglomerator; and
   a granulating device for cutting the strands of agglomerated material into granule-size agglomerate.

8. The apparatus of claim 7, wherein the size of the through-holes is within a range from 80 to 120 mm.

9. The apparatus of claim 7, wherein the chopping device has a single-shaft with first knives mounted on the shaft and stationary second knives mounted at an input side of the chopping device, and wherein a shield with through-holes is provided around the shaft downstream of the input side.

10. The apparatus of claim 7, wherein the shield is constructed as a perforated sheet.

11. The apparatus of claim 7, further comprising a conveyor belt that transports clumps of material between the chopping device and the agglomerator.

12. The apparatus of claim 7, further comprising a screw conveyor that transports the clumps of material into the agglomerator.

13. The apparatus of claim 12, wherein the screw conveyor transports the clumps of material downward into the agglomerator.

14. The apparatus of claim 12, further comprising a funnel that is provided at an upper end of the screw conveyor and wherein the conveyor belt transports the clumps of material into the funnel.

15. The apparatus of claim 7, wherein the agglomerator is a plate compactor.

* * * * *